US012455066B1

(12) United States Patent
Lai

(10) Patent No.: US 12,455,066 B1
(45) Date of Patent: Oct. 28, 2025

(54) MULTI-STAGE ADJUSTABLE TELESCOPIC LAMP

(71) Applicant: Fujian Yongdeji Lamp Industry Co., Ltd, Fujian (CN)

(72) Inventor: Yongqing Lai, Fujian (CN)

( * ) Notice: Subject to any disclaimer, the term of this patent is extended or adjusted under 35 U.S.C. 154(b) by 0 days.

(21) Appl. No.: 18/857,802

(22) PCT Filed: Jul. 20, 2022

(86) PCT No.: PCT/CN2022/106782
§ 371 (c)(1),
(2) Date: Oct. 17, 2024

(87) PCT Pub. No.: WO2024/016218
PCT Pub. Date: Jan. 25, 2024

(51) Int. Cl.
*F21V 21/22* (2006.01)

(52) U.S. Cl.
CPC .................................... *F21V 21/22* (2013.01)

(58) Field of Classification Search
CPC ........................................................ F21V 21/22
See application file for complete search history.

(56) References Cited

U.S. PATENT DOCUMENTS

2005/0201085 A1* 9/2005 Aikawa .................. F21L 4/045
362/198

FOREIGN PATENT DOCUMENTS

CN 105844819 A * 8/2016

* cited by examiner

*Primary Examiner* — Sean P Gramling

(57) ABSTRACT

A multi-stage adjustable telescopic lamp is disclosed, including a screw base, a first telescopic sleeve, a second telescopic sleeve, a third telescopic sleeve, a fixed component, an outer frame, a lighting unit and a lamp body. A bottom of the screw base is connected with a top of the first telescopic sleeve, the first telescopic sleeve is slidably sleeved with the second telescopic sleeve, the second telescopic sleeve is slidably sleeved with the third telescopic sleeve, and the bottoms of the first telescopic sleeve and the second telescopic sleeve are provided with fixed components. By providing a three-stage telescopic structure, it solve the problem that when the telescopic lamp is extended or retracted, if the depth of a suspended light fixture having an opening exceeds the maximum extension length of the telescopic lamp, replacement cannot be performed due to a limited telescopic range.

9 Claims, 5 Drawing Sheets

MULTI-STAGE ADJUSTABLE TELESCOPIC LAMP

CROSS REFERENCE TO RELATED APPLICATION

The present application is a continuation of PCT Patent Application No. PCT/CN2022/106782, entitled "MULTI-STAGE ADJUSTABLE TELESCOPIC LAMP", filed on Jul. 20, 2022, which is incorporated by reference herein in its entirety.

TECHNICAL FIELD

The present application relates to the technical field of telescopic lamps, and in particular to a multi-stage adjustable telescopic lamp.

BACKGROUND

Nowadays there are still a lot of threaded lamps and threaded lamp bases in the market, ordinary bulbs can not be adjusted flexibly in a direction of illumination, and an installation height of the lamps are limited by the lamp bases. In addition, there are currently some telescopic lamps on the market, however in practice, these current telescopic lamps are insufficient to meet the more stringent needs of use, such as when replacing a suspended opening light fixture with a deeper depth, which cannot further provide a greater range of retractable, resulting in irreplaceable replacement. And limited by the fixed lamp bases, an irradiation angle of the telescopic lamps can not be adjusted, so it can not meet the needs of use.

SUMMARY

In view of problems existed in the current telescopic lamps, the present disclosure aims to provide a multi-stage adjustable telescopic lamp to address problems that when the current telescopic lamps are used for replacing the suspended opening light fixture with different depths, the telescopic lamps may be unable to be replaced due to insufficient length of the telescopic length and the irradiation angles of the telescopic lamp may not be adjustable.

To achieve above objectives, the present disclosure adopts the following technical solutions. In some embodiments of the present disclosure, a multi-stage adjustable telescopic lamp is provided, including a screw base, a first telescopic sleeve, a second telescopic sleeve, a third telescopic sleeve, a fixed component, an outer frame, a lighting unit, and lamp body. Herein a bottom of the screw base is connected to a top of the first telescopic sleeve, the first telescopic sleeve is slidingly sleeved with the second telescopic sleeve, and the second telescopic sleeve is slidingly sleeved with the third telescopic sleeve. Bottoms of the first telescopic sleeve and the second telescopic sleeve each is provided with the fixed component for limiting a stretch length of a telescopic light. The lighting unit is provided inside the lamp body, the outer frame is connected to the lamp body by means of a rotatable component, and a top of the outer frame is connected to a bottom of the third telescopic sleeve. And the lighting unit is electrically connected to the screw base by means of a wire.

Preferably, an outer wall of the first telescopic sleeve is sleeved with an inner wall of the second telescopic sleeve, and an outer wall of the second telescopic sleeve is sleeved with an inner wall of the third telescopic sleeve.

Preferably, the fixed component comprises elastic fixed rings, and the clastic fixed rings are provided on outer sides of the bottoms of the first telescopic sleeve and the second telescopic sleeve, to connect with inner walls of the second telescopic sleeve and the third telescopic sleeve, respectively.

Preferably, an outer wall of the first telescopic sleeve is provided with a first ridge to protrude outwardly to come into contact with an interspace between two adjacent ridges disposed on an inner wall of the second telescopic sleeve, and an outer wall of the second telescopic sleeve is provided with a second ridge to protrude outwardly to come into contact with an interspace between two adjacent ridges disposed on an inner wall of the third telescopic sleeve.

Preferably, the bottom of the third telescopic sleeve is connected to the top of the outer frame by means of a rotating component.

Preferably, the rotating component comprises an annular flange and an annular groove.

Preferably, the annular flange is disposed on the top of the outer frame, and the annular groove is disposed on an inner side of the bottom of the third telescopic sleeve.

Preferably, the rotatable component comprises rotation shafts disposed on both sides of a center cavity of the outer frame, and the lamp body is rotated around the rotation shafts.

Preferably, the both sides of the center cavity of the outer frame are provided with support bars opposite each other, the rotation shafts are provided on insides of the support bars for fixing a position of the lamp body, and the support bars are spaced to match a dimension of the lamp body.

Preferably, the lamp body is provided with a curved lampshade.

Distinguished from the existing technologies, the technical solutions of the present disclosure at least have the following beneficial effects and advantages.

1. A multi-stage connecting telescopic structure is formed through the first telescopic sleeve, the second telescopic sleeve and the third telescopic sleeve, so that the overall telescopic length of the telescopic lamp can be adjusted to a wider range, thereby improving applicability and convenience.

2. Through the rotatable component, the lamp body can be rotated at a certain angle within the outer frame of the telescopic lamp, so that the lighting unit in the lamp body can be tilted at a certain angle, which is convenient for adjusting the angle of illumination of the light source.

BRIEF DESCRIPTION OF THE DRAWINGS

The accompanying drawings illustrated herein are used to provide a further understanding of embodiments of the present disclosure, form a part of this application, and do not constitute a limitation of embodiments of the present disclosure.

Figure 1:
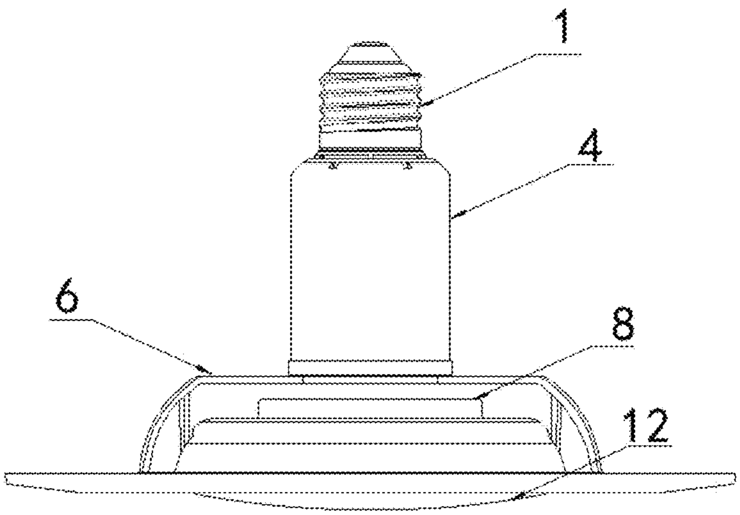
FIG. 1 shows a schematic diagram of a fully contracted state of a multi-stage adjustable telescopic lamp in accordance with some embodiments of the present disclosure.
Figure 2:
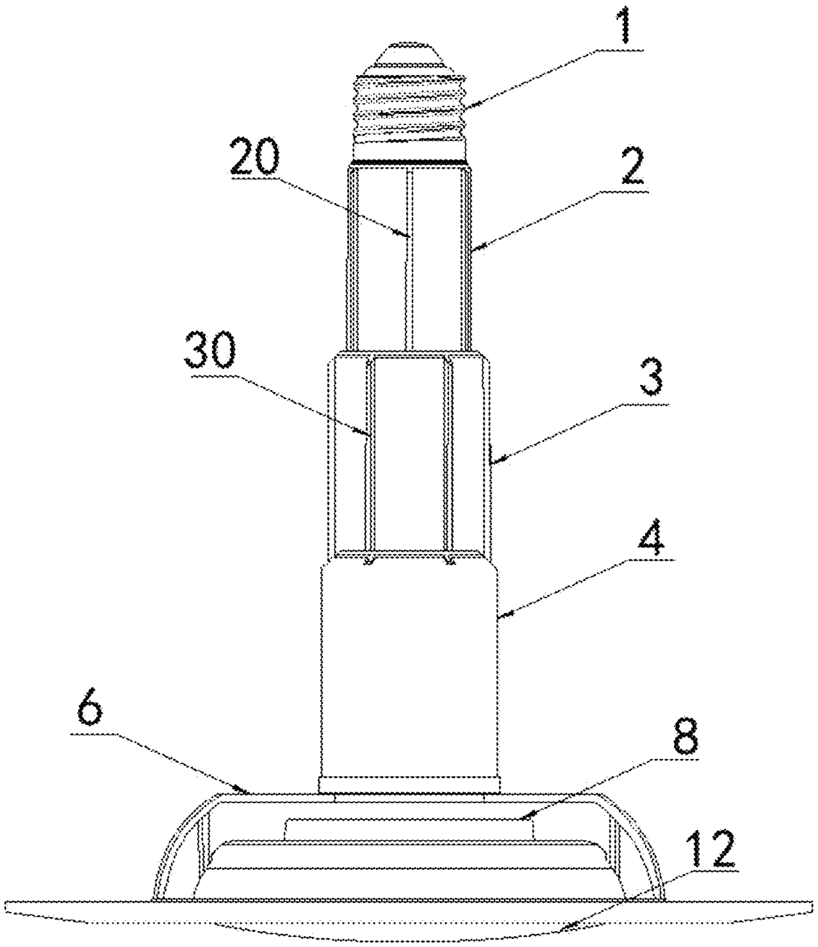
FIG. 2 shows a schematic diagram of a fully extended state of the multi-stage adjustable telescopic lamp in accordance with some embodiments of the present disclosure.
Figure 3:
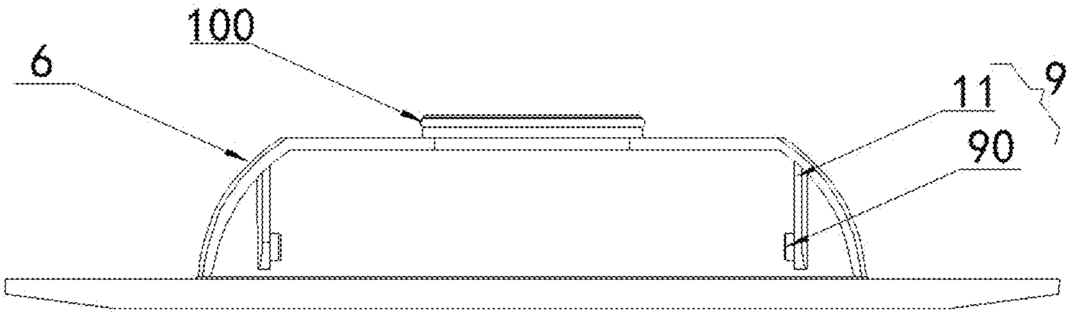
FIG. 3 shows a structure schematic diagram of the multi-stage adjustable telescopic lamp in accordance with some embodiments of the present disclosure.
Figure 4:
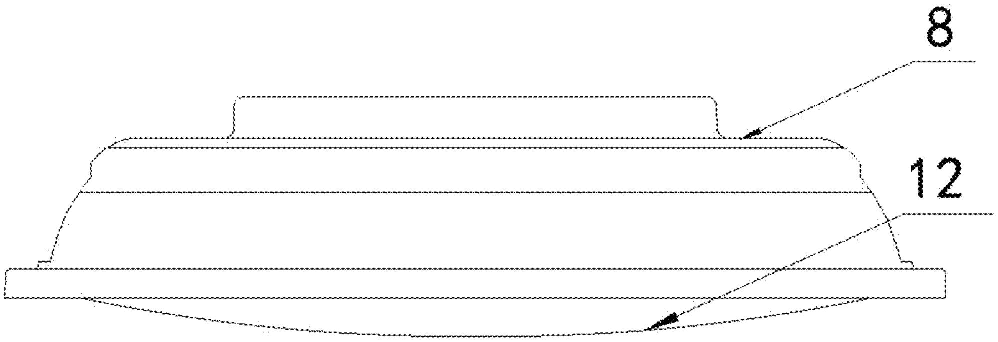
FIG. 4 shows a structure schematic diagram of a lamp body of the multi-stage adjustable telescopic lamp in accordance with some embodiments of the present disclosure.

In the Drawings, Reference Signs are as Follows.

1. Screw base.
2. First telescopic sleeve.
20. First ridge.
3. Second telescopic sleeve.
30. Second ridge.
4. Third telescopic sleeve.
5. Fixed component.
50. Elastic fixed ring.
6. Outer frame.
7. Lighting unit.
8. Lamp body.
9. Rotatable component.
90. Rotation shaft.
10. Rotating component.
100. Annular flange.
101. Annular groove.
11. Support bar.
12. Lampshade.

DETAILED DESCRIPTION OF THE EMBODIMENTS

To explain in detail the technical solutions, structural features, objectives and advantages of the present disclosure, the following will described specific embodiments and illustrated in detail in conjunction with the accompanying drawings.

As used herein, "embodiments" means that particular features, structures, or characteristics described in conjunction with the embodiments may be included in at least one embodiment of the present disclosure, the term "embodiments" appearing at various places in the specification does not necessarily refer to the same embodiments, nor does it specifically limit the independence or correlation between them and other embodiments. In principle, in this application, as long as there is no technical contradiction or conflict, the technical features mentioned in each embodiment can be combined in any way to form corresponding implementable technical solutions.

Unless otherwise defined, technical terms used herein have the same meaning as is commonly understood by one person having ordinary skill in the art to which this application belongs. The use of relevant terms herein is only for the purpose of describing specific embodiments and is not intended to limit this application.

In the description of the present disclosure, the term "and/or" is an expression used to describe a logical relationship between objects, indicating that three kinds of relationships can exist, for example, A and/or B, indicating that there exists A, there exists B, and there exists A and B at the same time. In addition, the character "/" in this paper generally indicates that the objects associated before and after are a type of "or" logical relationship.

As used herein, the terms such as "first", and "second" are used only to distinguish one entity or operation from another, and do not necessarily require or imply any actual quantitative, primary and secondary, or sequential relationship between these entities or operations, orders, etc., between these entities or operations.

Without further limitation, herein the expressions "comprising", "comprise", "include" or other similar expressions as used in this application, are intended to cover non-exclusive inclusion, these expressions do not preclude the existence of additional elements in a process, method, or product that includes the described elements, such that the process, method, or product that includes a range of elements may include not only those elements that are limited, but also other elements that are not explicitly listed, or that are inherent to such a process, method, or product.

As understood in the Examination Guidelines, herein the expressions "greater than", "less than", "more than", etc. are understood in this application to exclude this number. The expressions such as "above", "below", and "within" are understood to include the present number. In addition, in the description of the embodiments of the present disclosure, "more than one" means two or more (including two), and the expressions similar to "more than one" are also understood in this manner, such as "more than one group", "multiple" and so on, unless otherwise expressly and specifically limited.

In the description of the embodiments of the present disclosure, spatially related expressions herein used, such as "center", "longitudinal", "transverse", "length", "width", "thickness", "up", "down", "front", "back", "left", "right", "vertical", "horizontal", "perpendicular", "top", "bottom", "inside", "outside", "clockwise", "counterclockwise", "axial", "radial", "circumferential" and the like, indicating orientations or positional relationships are based on specific embodiments or the orientations or positional relationships shown in the accompanying drawings, and is only for the purpose of facilitating the description of the specific embodiments of the present disclosure or for a reader's understanding, and is not intended to indicate or imply that a device or a component referred to must have a particular location, a particular orientation, or be constructed or operated in the particular orientation, and therefore is not to be construed as a limitation of embodiments of the present disclosure.

Unless otherwise expressly specified or limited, the terms "mounted", "connected", "connection", "fixed", "disposed", and the like used in the description of the embodiments of the present disclosure are to be broadly construed. For example, the term "connection" may be a fixed connection, a removable connection, or a one-piece setup. It may be a mechanical connection, an electrical connection, or a communication connection. It may be a direct connection, or an indirect connection through an intermediate medium. It may be a connection within two elements or an interaction relationship between the two elements. For the person having ordinary skill in the art, the specific meanings of the above terms in the embodiments of the present disclosure may be understood according to the specific circumstances.

Referring to FIG. 1 to FIG. 8, in some embodiments of the present disclosure, a multi-stage adjustable telescopic lamp is provided, including a screw base 1, a first telescopic sleeve 2, a second telescopic sleeve 3, a third telescopic sleeve 4, a fixed component 5, an outer frame 6, a lighting unit 7, a lamp body 8, and a rotatable component 9. Preferably, all telescopic sleeves are hollow cylinder. A bottom of the screw base 1 is connected to a top of the first telescopic sleeve 2, the first telescopic sleeve 2 is slidingly sleeved with the second telescopic sleeve 3, the second telescopic sleeve 3 is slidingly sleeved with the third telescopic sleeve 4, and a top of the outer frame 6 is connected to a bottom of the third telescopic sleeve 4. In this way, a multi-stage telescopic structure is formed through the first telescopic sleeve 2, the second telescopic sleeve 3 and the third telescopic sleeve 4, the telescopic length of the telescopic lamp can be increased, which can meet the installation of the telescopic lamp with a wider range of spacing between a lamp holder in a ceiling hole and the ceiling. Bottoms of the first telescopic sleeve 2 and the second telescopic sleeve 3 each is provided with the fixed component 5 for limiting a stretch length of a telescopic light, to avoid the second telescopic sleeve 3 from coming out of the first telescopic sleeve 2, and also avoid the third telescopic sleeve from coming out of the second telescopic sleeve 3. The lighting unit 7 is provided inside the lamp body 8, and the outer frame 6 is connected to the lamp body 8 by means of the rotatable component 9, this allows the lamp body 8 to be deflected within the outer frame 6, which can change illumination angles of the lamp body 8, thus facilitating adjustment of the illumination angles. The lighting unit 7 is electrically connected to the screw base 1 by means of a wire, and a length of the wire is slightly longer than a distance from the screw base to the lighting unit when fully extended. The wire is generally used as a soft wire, and when the telescopic lamp is contracted, the wire can be twisted and placed inside the telescopic sleeve after contraction. In addition, the length of the wire should be reserved a part for the deflection of the lamp body in the outer frame. Since the lamp body of the present disclosure is only deflected in the outer frame, the angle is not very large, so as long as the wire will be reserved longer to meet the rotation needs. Of course, the lamp body and the outer frame bracket should be spaced, that is, not only meet the deflection needs, but also can accommodate the wire.

When in actual use, the screw base is first threaded with the preset lamp base (usually the lamp base in the ceiling hole), and the stretch lengths of the first telescopic sleeve 2, the second telescopic sleeve 3, and the third telescopic sleeve 4 are adjusted according to user requirements of actual scenarios, so that the lamp body cover at the ceiling hole. Of course, when replacing the suspended opening light fixture, the stretch length of the telescopic lamp is adjusted firstly, and then the telescopic lamp is screwed onto the screw base. After the installation is completed, the rotatable component 9 is rotated to allow the lamp body 9 deflecting, so as to achieve the purpose of adjusting the irradiation angle of the lighting unit 7, which can make the telescopic lamp applicable to more complex use of the scene, such as the needs of different lighting areas. Moreover, a split structure of the lamp body 8 and the outer frame 6 makes it easy to disassemble and replace the lamp body 8 during maintenance.

In some preferred embodiments of the present disclosure, the telescopic lamp may be further set up for more than three level (e.g., four levels, which would require another additional telescopic sleeve) of telescopic adjustment, so that the telescopic length is longer and can be adapted to more varied installation needs.

In some embodiments of the present disclosure, to realize telescoping, an inner diameter of a middle part of each telescopic sleeve for telescoping contact is the same, and an outer diameter of the middle part is also the same, so that in the process of telescoping, the spacing between the telescopic sleeves will not change, which can make the telescoping structure stable. Preferably, the outer wall of the first telescopic sleeve 2 is in contact with the inner wall of the second telescopic sleeve 3, the outer wall of the second telescopic sleeve 3 is in contact with the inner wall of the third telescopic sleeve 4, so as to make the overall telescopic structure more stable in the process of telescoping.

Figure 7:
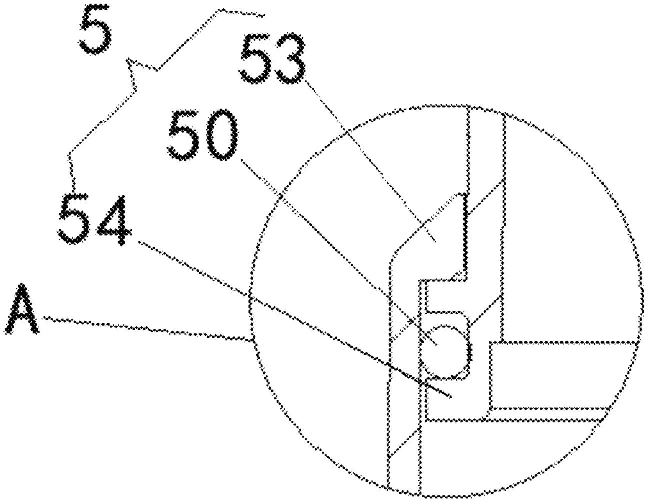
FIG. 7 shows a local enlarged view of a fixed component of the multi-stage adjustable telescopic lamp in accordance with some embodiments of the present disclosure.
Figure 8:
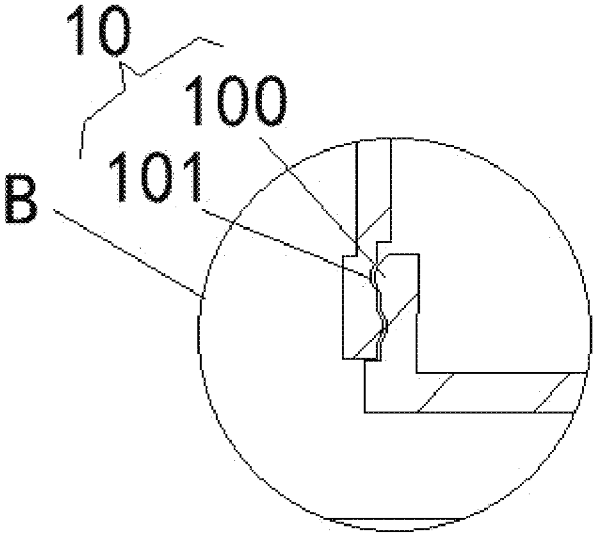
FIG. 8 shows a local enlarged view of a rotating component of the multi-stage adjustable telescopic lamp in accordance with some embodiments of the present disclosure.

In some embodiments of the present disclosure, the fixed component 5 is used to limit the position of telescoping, as shown in FIG. 7, the fixed component 5 may include an outer rim 53 and an inner convex rim 54, the outer rim 53 is provided at a top inner periphery of outer telescopic sleeve, and the inner convex rim 54 is provided at a bottom outer periphery of inner telescopic sleeve, in this way, when stretched to its maximum length, the inner convex rim 54 can be abutted against the outer rim 53, thus avoiding that the inner telescopic sleeve can be dislodged from within the outer telescopic sleeve. In some embodiments of the present disclosure, the outer rim 53 may be realized in other forms, such as upper ends of the second telescopic sleeve 3 and the third telescopic sleeve 4 are contracted inwardly for telescoping, and when the telescopic lamp is fully stretched, to connect with the upper end of the fixed component 5 of the first telescopic sleeve 2 and the upper end of the fixed component 5 of the second telescopic sleeve 3 respectively, so as to avoid damage to the telescopic lamp due to overstretching by misuse during stretching, which may result in separation of the telescopic structure. Preferably, the fixed component 5 further includes clastic fixed rings 50, and the elastic fixed rings 50 are provided on the outer sides of the bottoms of the first telescopic sleeve 2 and the second telescopic sleeve 3, to connect with the inner walls of the second telescopic sleeve 3 and the third telescopic sleeve 4, respectively. During the contraction process of the telescopic lamp, the elastic fixed rings 50 through their own deformation to generate a force on the contact surface of both sides, allowing the relative positions of the first telescopic sleeve 2 and the second telescopic sleeve 3 to realize fixation, so that the telescopic lamp can be adjusted and fixed at any length.

Preferably, the outer wall of the first telescopic sleeve 2 is provided with a first ridge 20 to protrude outwardly to come into contact with an interspace between two adjacent ridges disposed on the inner wall of the second telescopic sleeve 3, and the outer wall of the second telescopic sleeve 3 is provided with a second ridge 30 to protrude outwardly to come into contact with an interspace between two adjacent ridges disposed on an inner wall of the third telescopic sleeve 4. By connecting the ridge with the interspace, the telescopic lamp will not be shifted due to the operation, and the friction will be reduced to avoid the problem of the telescope being stuck due to the reduction of the surface contact.

Figure 5:
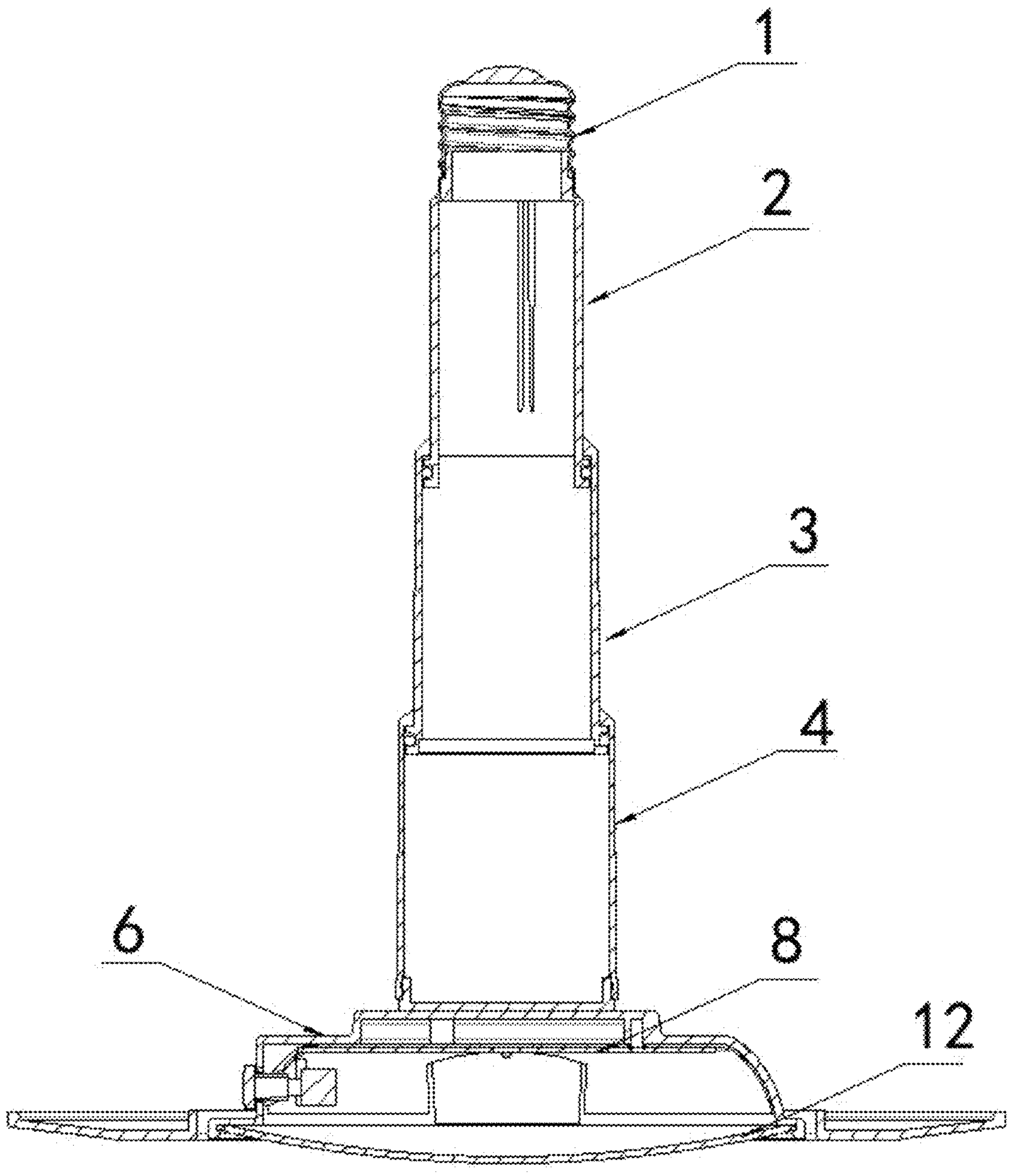
FIG. 5 shows a section view of a fully contracted state of a multi-stage adjustable telescopic lamp in accordance with some embodiments of the present disclosure.
Figure 6:
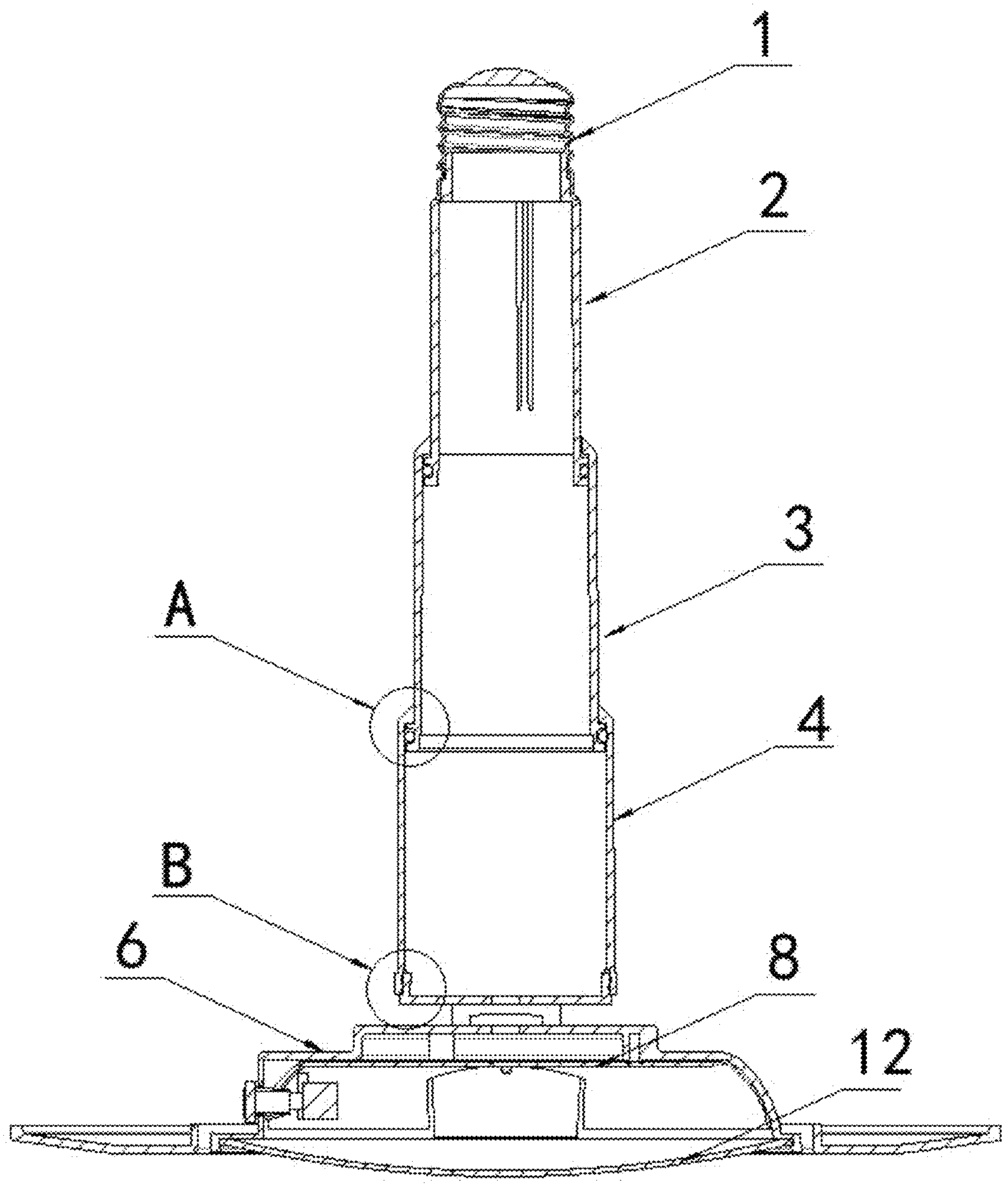
FIG. 6 shows another section view of a fully contracted state of a multi-stage adjustable telescopic lamp in accordance with some embodiments of the present disclosure.

Preferably, the bottom of the third telescopic sleeve 4 is connected to the top of the outer frame 6 by means of a rotating component 10, which makes the outer frame 6 rotatable, so that, in combination with the rotatable component, it is possible to adjust the illumination direction of the light source with more angles. A top centre of the outer frame 6 is provided with an opening for passing a wire through. The top of the outer frame can be connected directly to the rotating component 10 (as shown in FIG. 5), or in some embodiments, it can be connected by a connecting post (as shown in FIG. 6). Herein it should be noted that, in order to avoid wire entanglement, the rotating component is not rotated 360°, and a limiting structure is set up internally (e.g., a small bump is set up at a contact position of the third telescopic sleeve and the outer frame respectively, and when rotated to a certain angle, the two bumps will be held against each other and cannot be rotated any further), so that after rotating to a certain angle, the limiting structure will limit the position to avoid 360° rotation. Of course, if the 360° rotation needs to be realized, a rotating electrical connector only need to be added at the rotating component 10, and then the wire is disconnected in the middle and connected through the rotating electrical connector, so that the 360° rotation can be realized without having to worry about the wire entanglement.

The rotating component 10 is sufficient as long as it is possible to rotate the two with respect to each other, e.g., this can be achieved by means of a pivot shaft and a shaft sleeve. Preferably, the rotating component 10 includes an annular flange 100 and an annular groove 101, and the annular flange 100 is disposed inside the annular groove 101 to realize the rotation of the outer frame 6.

In the embodiments of the present disclosure, setting positions of the annular flange 100 and the annular groove 101 are not limited, preferably the annular flange 100 is disposed at the top of the outer frame, the annular groove 101 is disposed at the inner side of the bottom of the third telescopic sleeve 4, which is more compact in structure and facilitates rotation of the outer frame 6. And meanwhile, an order of internal and external sleeve connection of all telescopic sleeves is also not limited, it may be that the first telescopic sleeve is on the outermost side and the other telescopic sleeves are sequentially set on the inner side (this is the preferred embodiments). Or the first telescopic sleeve is on the innermost side and the other telescopic sleeves are sequentially set on the outer side.

The rotatable component as long as it can realize the deflection, such as can be a universal ball head connection, that is, the outer frame can be set into a spherical groove slightly larger than the hemisphere, the lamp body is a ball head, and the lamp body is placed in the spherical groove, which can realize the deflection. In some embodiments, the rotatable component 9 includes rotation shafts 90 disposed on both sides of a center cavity of the outer frame 6, and the lamp body 8 is rotated around the rotation shafts 90. Moreover, the lamp body 8 is set in the middle of the rotation shafts 90, and there is a gap between the top of the lamp body 8 and inside of the top of the outer frame 6, thus the lamp body 8 can be rotated at a certain angle, and meanwhile with the rotation of the outer frame 6, the adjustment of the irradiation angle can be realized, which increases applicability.

Preferably, the both sides of the center cavity of the outer frame 6 are provided with support bars 11 opposite each other, the rotation shafts 90 are provided on insides of the support bars 11 for fixing a position of the lamp body 8, and the support bars 11 are spaced to match a dimension of the lamp body 8. The support bars 11 may be plastic, and the overall structural material of the multi-stage adjustable telescopic lamp of the present disclosure may also be plastic. Furthermore, the support bars can realize a certain deformation, which can hold against the lamp body, making the rotation shafts being placed inside the lamp body, such that the connection between the lamp body 8 and the outer frame 6 is more stable, thereby avoiding possible separation from the outer frame 6 when the lamp body 8 is rotated.

Preferably, the lighting unit is an LED lighting unit, which makes the telescopic lamp more energy efficient. LED lighting unit generally also includes a rectifier module, and the rectifier module can be set in the lamp body.

Preferably, the lamp body 8 is provided with a round lampshade 12, which makes the light more evenly dispersed to the space and improves the uniformity of irradiation, and increases the space inside the lampshade 12, thus can effectively slow down the temperature rise inside the lamp body 8 and prolong the service life of the light unit.

It should be noted that although the embodiments have been described herein, it is not intended to limit the scope of protection of the present invention. Therefore, based on the innovative concept of the present invention, any changes and modifications to the embodiments described herein, or equivalent structures or equivalent process transformations utilizing the contents of the specification of the present disclosure and the accompanying drawings, and directly or indirectly applying the above technical solutions in other related technical fields, are all included in the scope of protection of the present invention.

What is claimed is:

1. A multi-stage adjustable telescopic lamp, comprising a screw base, a first telescopic sleeve, a second telescopic sleeve, a third telescopic sleeve, a fixed component, an outer frame, a lighting unit, and a lamp body;

wherein a bottom of the screw base is connected to a top of the first telescopic sleeve, the first telescopic sleeve is slidingly sleeved with the second telescopic sleeve, and the second telescopic sleeve is slidingly sleeved with the third telescopic sleeve;

wherein bottoms of the first telescopic sleeve and the second telescopic sleeve each is provided with the fixed component for limiting a stretch length of a telescopic light;

wherein the lighting unit is provided inside the lamp body, the outer frame is connected to the lamp body by means of a rotatable component, and a top of the outer frame is connected to a bottom of the third telescopic sleeve;

wherein the lighting unit is electrically connected to the screw base by means of a wire; and wherein an outer wall of the first telescopic sleeve is provided with a first ridge to protrude outwardly to come into contact with an interspace between two adjacent ridges disposed on an inner wall of the second telescopic sleeve, and an outer wall of the second telescopic sleeve is provided with a second ridge to protrude outwardly to come into contact with an interspace between two adjacent ridges disposed on an inner wall of the third telescopic sleeve.

2. The multi-stage adjustable telescopic lamp according to claim 1, wherein an outer wall of the first telescopic sleeve is sleeved with an inner wall of the second telescopic sleeve, and an outer wall of the second telescopic sleeve is sleeved with an inner wall of the third telescopic sleeve.

3. The multi-stage adjustable telescopic lamp according to claim 2, wherein the fixed component comprises elastic fixed rings, and the elastic fixed rings are provided on outer sides of the bottoms of the first telescopic sleeve and the second telescopic sleeve, to connect with inner walls of the second telescopic sleeve and the third telescopic sleeve, respectively.

4. The multi-stage adjustable telescopic lamp according to claim 1, wherein the bottom of the third telescopic sleeve is connected to the top of the outer frame by means of a rotating component.

5. The multi-stage adjustable telescopic lamp according to claim 4, wherein the rotating component comprises an annular flange and an annular groove.

6. The multi-stage adjustable telescopic lamp according to claim 5, wherein the annular flange is disposed on the top of the outer frame, and the annular groove is disposed on an inner side of the bottom of the third telescopic sleeve.

7. The multi-stage adjustable telescopic lamp according to claim 1, wherein the lamp body is provided with a curved lampshade.

8. A multi-stage adjustable telescopic lamp, comprising a screw base, a first telescopic sleeve, a second telescopic sleeve, a third telescopic sleeve, a fixed component, an outer frame, a lighting unit, and a lamp body;

wherein a bottom of the screw base is connected to a top of the first telescopic sleeve, the first telescopic sleeve is slidingly sleeved with the second telescopic sleeve, and the second telescopic sleeve is slidingly sleeved with the third telescopic sleeve;

wherein bottoms of the first telescopic sleeve and the second telescopic sleeve each is provided with the fixed component for limiting a stretch length of a telescopic light;

wherein the lighting unit is provided inside the lamp body, the outer frame is connected to the lamp body by means of a rotatable component, and a top of the outer frame is connected to a bottom of the third telescopic sleeve;

wherein the lighting unit is electrically connected to the screw base by means of a wire; and wherein the rotatable component comprises rotation shafts disposed on both sides of a center cavity of the outer frame, and the lamp body is rotated around the rotation shafts.

9. The multi-stage adjustable telescopic lamp according to claim 8, wherein both sides of the center cavity of the outer frame are provided with support bars opposite each other, the rotation shafts are provided on insides of the support bars for fixing a position of the lamp body, and the support bars are spaced to match a dimension of the lamp body.

* * * * *